US011871211B2

(12) United States Patent
Imaizumi et al.

(10) Patent No.: US 11,871,211 B2
(45) Date of Patent: Jan. 9, 2024

(54) SIGNAL PROCESSING APPARATUS, SIGNAL PROCESSING METHOD, AND SIGNAL PROCESSING PROGRAM

(71) Applicant: Nippon Telegraph and Telephone Corporation, Tokyo (JP)

(72) Inventors: Kenta Imaizumi, Musashino (JP); Kimitaka Tsutsumi, Musashino (JP); Atsushi Nakadaira, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 159 days.

(21) Appl. No.: 17/639,008

(22) PCT Filed: Aug. 29, 2019

(86) PCT No.: PCT/JP2019/033870
§ 371 (c)(1),
(2) Date: Feb. 28, 2022

(87) PCT Pub. No.: WO2021/038782
PCT Pub. Date: Mar. 4, 2021

(65) Prior Publication Data

US 2022/0312145 A1 Sep. 29, 2022

(51) Int. Cl.
*H04S 7/00* (2006.01)
*H04R 5/02* (2006.01)
(Continued)

(52) U.S. Cl.
CPC ............... *H04S 7/307* (2013.01); *H04R 5/02* (2013.01); *H04R 5/04* (2013.01); *H04R 5/027* (2013.01);
(Continued)

(58) Field of Classification Search
None
See application file for complete search history.

(56) References Cited

U.S. PATENT DOCUMENTS 10,433,093 B2 * 10/2019 Setiawan ................ H04S 7/302

FOREIGN PATENT DOCUMENTS

JP 2012169895 9/2012

OTHER PUBLICATIONS

Haneda et al., "Directivity synthesis using multipole sources based on spherical harmonic expansion," Journal of the Acoustical Societyof Japan, 2013, 69(11):577-588, 25 pages (with English Translation).
(Continued)

*Primary Examiner* — Kenny H Truong
(74) *Attorney, Agent, or Firm* — Fish & Richardson P.C.

(57) ABSTRACT

A signal processing device 1 includes an expansion coefficient calculation unit 11 that, from an outward sound field to be reproduced, calculates a spherical harmonics expansion coefficient for reproducing the sound field; an expansion coefficient conversion unit 12 that converts the calculated spherical harmonics expansion coefficient into a weight factor for superposition of multipole sources; a filter coefficient calculation unit 13 that, from the weight factor, calculates a filter coefficient corresponding to each speaker included in a multipole speaker array, the speaker providing output outwardly; and a convolution operation unit 14 that convolves the filter coefficient corresponding to each speaker into an input acoustic signal to calculate an output acoustic signal for each speaker.

6 Claims, 6 Drawing Sheets

(51) Int. Cl.
*H04R 5/04* (2006.01)
*H04R 5/027* (2006.01)

(52) U.S. Cl.
CPC ..... *H04R 2201/401* (2013.01); *H04S 2400/11* (2013.01); *H04S 2400/15* (2013.01)

(56) References Cited

OTHER PUBLICATIONS

Poletti, "Three-Dimensional Surround Sound Systems Based on Spherical Harmonics," Journal of the Audio Engineering Society, 2005, 53(11):1004-1025.

* cited by examiner (a)

(b)

SIGNAL PROCESSING APPARATUS, SIGNAL PROCESSING METHOD, AND SIGNAL PROCESSING PROGRAM

CROSS-REFERENCE TO RELATED APPLICATIONS

This application is a National Stage application under 35 U.S.C. § 371 of International Application No. PCT/JP2019/033870, having an International Filing Date of Aug. 29, 2019, the disclosure of which is considered part of the disclosure of this application, and is incorporated in its entirety into this application.

TECHNICAL FIELD

The present invention relates to a signal processing device, a signal processing method, and a signal processing program.

BACKGROUND ART

In recent years, reproduction schemes with multiple arranged speakers have been popularized for public viewing and at home. With popularization of video technologies, such as 3D (three-dimensional) videos and wide videos, efforts have also been made to achieve acoustic reproduction with a higher sense of presence. Specifically, directions of arrival and loudness of sounds are controlled by the speakers for scenes of videos. In particular, a desired sound field is reproduced through a sound field reproduction technology using a speaker array including multiple disposed speakers.

As a general sound field reproduction technology, there is a Pressure-Matching based approach of solving an inverse problem of matching the desired sound field and a sound field to be reproduced. Inverse problems, however, are ill-conditioned problems, and tend to give unstable solutions. In contrast, approaches based on analytic approaches with a spherical speaker array using spherical harmonics or a linear speaker array using an angle spectrum may often give stabler solutions than the inverse problems, and many such approaches have been proposed.

There is an approach of reproducing directional characteristics of the spherical harmonics through superposition of multipole sources (see Patent Literature 1). Patent Literature 1 applies a spherical harmonics expansion coefficient to the directional characteristics of the spherical harmonics reproduced through the superposition of the multipole sources, and thus reproduces the directional characteristics generated by the spherical harmonics, through the superposition of the multipole sources. The spherical harmonics expansion coefficient is obtained through an inverse problem such as a least square method, or spherical harmonic expansion of the sound field.

There is a method of reproducing the desired sound field through a mode-matching approach (Non-Patent Literature 1). Non-Patent Literature 1 collects sounds with a spherical microphone array, and reproduces an expanded sound field with the spherical speaker array.

There is also the multipole source as a method of controlling directivity of the sounds emitted from the speakers (Non-Patent Literature 2). The multipole source is an approach of expressing the directivity of the sounds with a combination of primitive directivities such as a dipole and a quadrupole. Each primitive directivity is achieved with a combination of sound sources having different polarities in proximity to one another.

CITATION LIST

Patent Literature

Patent Literature 1: Japanese Patent Laid-Open No. 2012-169895

Non-Patent Literature

Non-Patent Literature 1: M. A. Poletti, "Three-Dimensional Surround Sound Systems Based on Spherical Harmonics," Journal of the Audio Engineering Society 53.11 (2005): p. 1004-1025.

Non-Patent Literature 2: Yoichi Haneda, Kenichi Furuya, Suehiro Shimauchi, "Directivity synthesis using multipole sources based on spherical harmonic expansion," The Journal of Acoustical Society of Japan, vol. 69, No. 11, pp 577-588, 2013.

SUMMARY OF THE INVENTION

Technical Problem

None of the literatures, however, discloses or suggests a method of reproducing the desired sound field with a multipole speaker array including multiple speakers that provide output outwardly. Patent Literature 1 and Non-Patent Literature 2 only reproduce the directional characteristics, and do not reproduce the sound field. In addition, Non-Patent Literature 1 uses the spherical speaker array, and does not use the multipole speaker array including the multiple speakers that provide the output outwardly.

In addition, the multipole source is not an orthogonal function, and thus cannot expand the sound field as with the spherical harmonics that are orthogonal functions. Accordingly, the reproduction of the sound field with the multipole speaker array requires derivation of a weight factor for superposition of multipoles. While the derivation through the Pressure-Matching based approach may be conceived as a general approach, the approach calculates the inverse problem and thus is likely to undesirably give unstable solutions.

In this way, the conventional art cannot derive the weight factor for the superposition of the multipoles, and thus cannot reproduce the desired sound field with the multipole speaker array including the multiple speakers that provide the output outwardly.

An object of the present invention, which has been accomplished in view of the above situation, is to provide a technology of reproducing the desired sound field with the multipole speaker array including the multiple speakers that provide the output outwardly.

Means for Solving the Problem

A signal processing device of one aspect of the present invention includes an expansion coefficient calculation unit that, from an outward sound field to be reproduced, calculates a spherical harmonics expansion coefficient for reproducing the sound field; an expansion coefficient conversion unit that converts the calculated spherical harmonics expansion coefficient into a weight factor for superposition of multipole sources; a filter coefficient calculation unit that, from the weight factor, calculates a filter coefficient corresponding to each speaker included in a multipole speaker array, the speaker providing output outwardly; and a convolution operation unit that convolves the filter coefficient corresponding to each speaker into an input acoustic signal to calculate an output acoustic signal for each speaker.

A signal processing method of one aspect of the present invention includes a step of calculating, by a computer from an outward sound field to be reproduced, a spherical harmonics expansion coefficient for reproducing the sound field; a step of converting, by the computer, the calculated spherical harmonics expansion coefficient into a weight factor for superposition of multipole sources; a step of calculating, by the computer from the weight factor, a filter coefficient corresponding to each speaker included in a multipole speaker array, the speaker providing output outwardly; and a step of convolving, by the computer, the filter coefficient corresponding to each speaker into an input acoustic signal to calculate an output acoustic signal for each speaker.

One aspect of the present invention is a signal processing program for causing a computer to function as the above described signal processing device.

Effect of the Invention

According to the present invention, it is possible to provide the technology of reproducing the desired sound field with the multipole speaker array including the multiple speakers that provide the output outwardly.

DESCRIPTION OF EMBODIMENT

Figure 1:
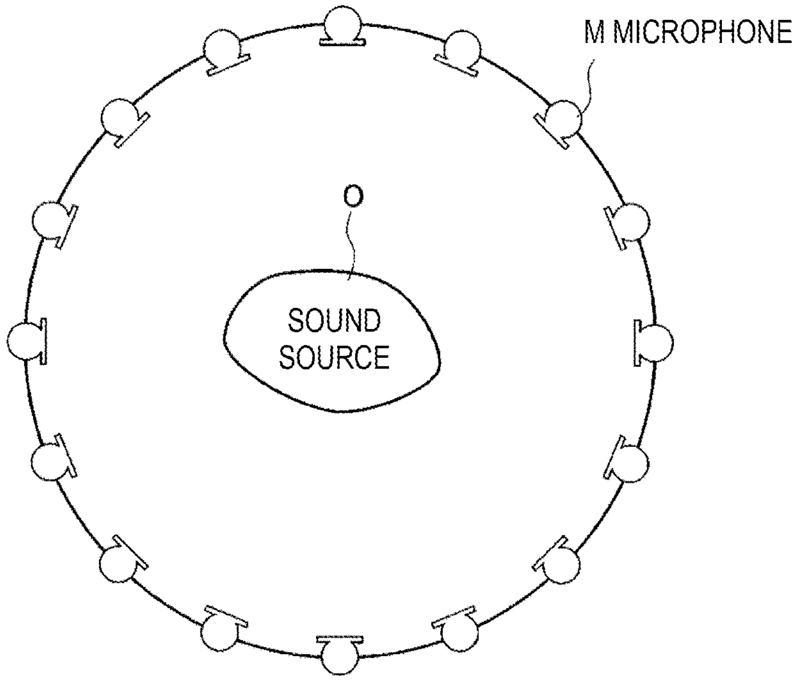
FIG. 1 is a diagram illustrating a sound collection environment and a reproduction environment in an embodiment of the present invention.
Figure 1:
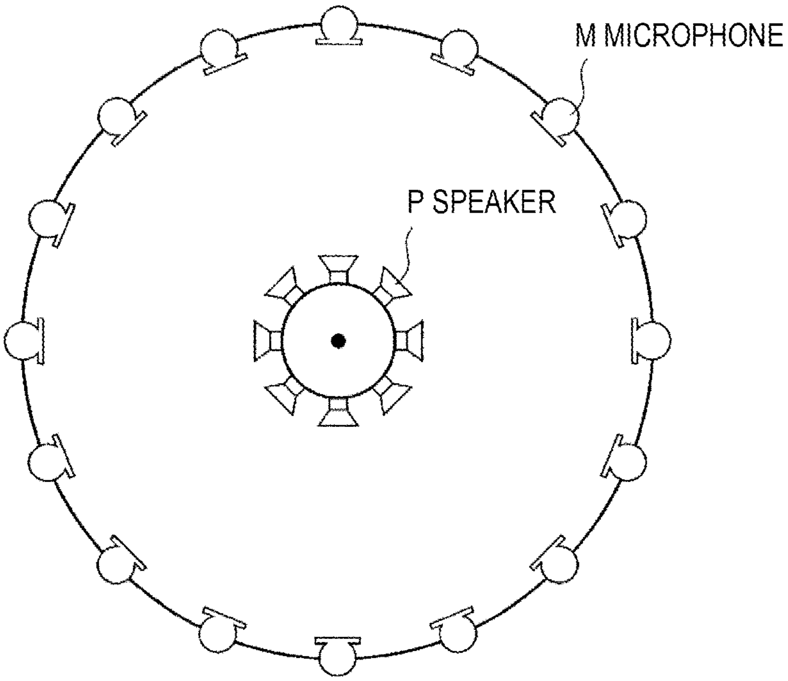

An embodiment of the present invention will be described below with reference to the drawings. In the drawings, the same reference signs are attached to the same portions and the description thereof will be omitted.

A signal processing device 1 according to the embodiment of the present invention generates, from an input acoustic signal, an output acoustic signal that reproduces a desired sound field with a multipole speaker array.

With reference to FIG. 1, a sound collection environment for the desired sound field and a reproduction environment for the desired sound field will be described.

As shown in FIG. 1(*a*), a spherical microphone array collects sounds from a desired sound source O. The sound source O is an outward sound field that provides output outwardly. The spherical microphone array is configured with microphones disposed around the sound source O. Data of a sound field to be achieved by the desired sound source O is identified through the sound collection. It should be noted that the data of the sound field does not need to be identified through the sound collection, and may be identified through modeling of a sound field to be reproduced.

The signal processing device 1 reproduces the desired sound field identified in FIG. 1(*a*), with the multipole speaker array as shown in FIG. 1(*b*). The multipole speaker array includes multiple speakers P that provide output outwardly. The signal processing device 1 generates an output acoustic signal to be output to each speaker P constituting the multipole speaker array.

The embodiment of the present invention derives an analytic expansion coefficient of spherical harmonics for reproducing the outward sound field with spherical harmony (spherical speaker array). The reproduction of the outward sound field with the multipole speaker array is achieved through analytic conversion of the derived expansion coefficient into a weight factor for superposition of multipole sources.

Figure 2:
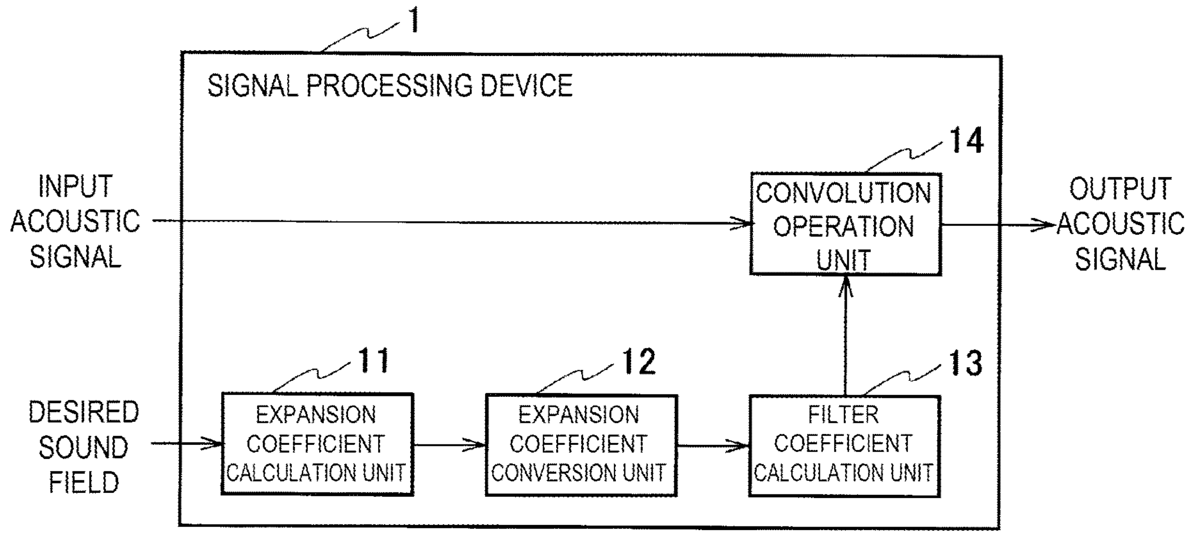
FIG. 2 is a block diagram showing a configuration of a signal processing device.

With reference to FIG. 2, the signal processing device 1 according to the embodiment of the present invention will be described. The signal processing device 1 includes an expansion coefficient calculation unit 11, an expansion coefficient conversion unit 12, a filter coefficient calculation unit 13, and a convolution operation unit 14.

The expansion coefficient calculation unit 11 calculates, from the outward sound field to be reproduced, a spherical harmonics expansion coefficient for reproducing this outward sound field.

Figure 3:
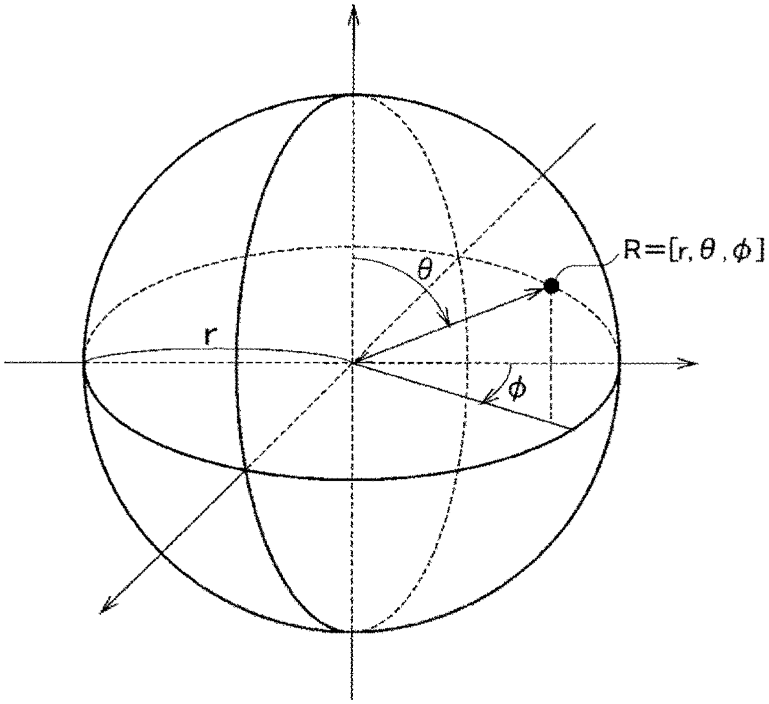
FIG. 3 is a diagram illustrating polar coordinates.

The sound field to be reproduced is calculated in accordance with Expression (1). Expression (1) expresses the sound field in polar coordinates as shown in FIG. 3. It should be noted that an x-axis direction and a y-axis direction are two axes orthogonal to each other on a plane where the multipole speaker array is disposed.

[Math. 1]

$$S(\theta, \phi, \omega) = \sum_{n=0}^{\infty} \sum_{m=-n}^{n} A_n^m(\omega) Y_n^m(\theta, \phi). \quad \text{Expression (1)}$$

$\theta,\phi$: arguments indicating an arbitrary control point in the polar coordinates $\omega$: an angular frequency ($=2\pi f$: f denotes frequency)

m,n: an order and a degree of a multipole in each of the x-axis direction and the y-axis direction where $-n \le m \le n$, $n \ge 0$ $Y_n^m(\theta,\phi)$: the spherical harmonics $A_n^m$: the spherical harmonics expansion coefficient The spherical harmonics in Expression (1) is defined in Expression (2).

[Math. 2]

$$Y_n^m(\theta, \phi) = \sqrt{\frac{2n+1(n-m)!}{4\pi(n+m)!}} P_n^m(\cos\theta) e^{jm\phi}, \quad \text{Expression (2)}$$

$P_n^m(\bullet)$: an associated Legendre function j: an imaginary number

The spherical harmonics expansion coefficient in Expression (1) is defined in Expression (3). Expression (3) is referred to as spherical harmonic expansion. The spherical harmonics expansion coefficient is obtained through the spherical harmonic expansion.

[Math. 3]

$$A_n^m(\omega)=\int_0^{2\pi}\int_0^{\pi}S(\theta,\phi,\omega)Y_n^m(\theta,\phi)^{*}\sin\theta d\phi d\theta. \qquad \text{Expression (3)}$$

Figure 4:
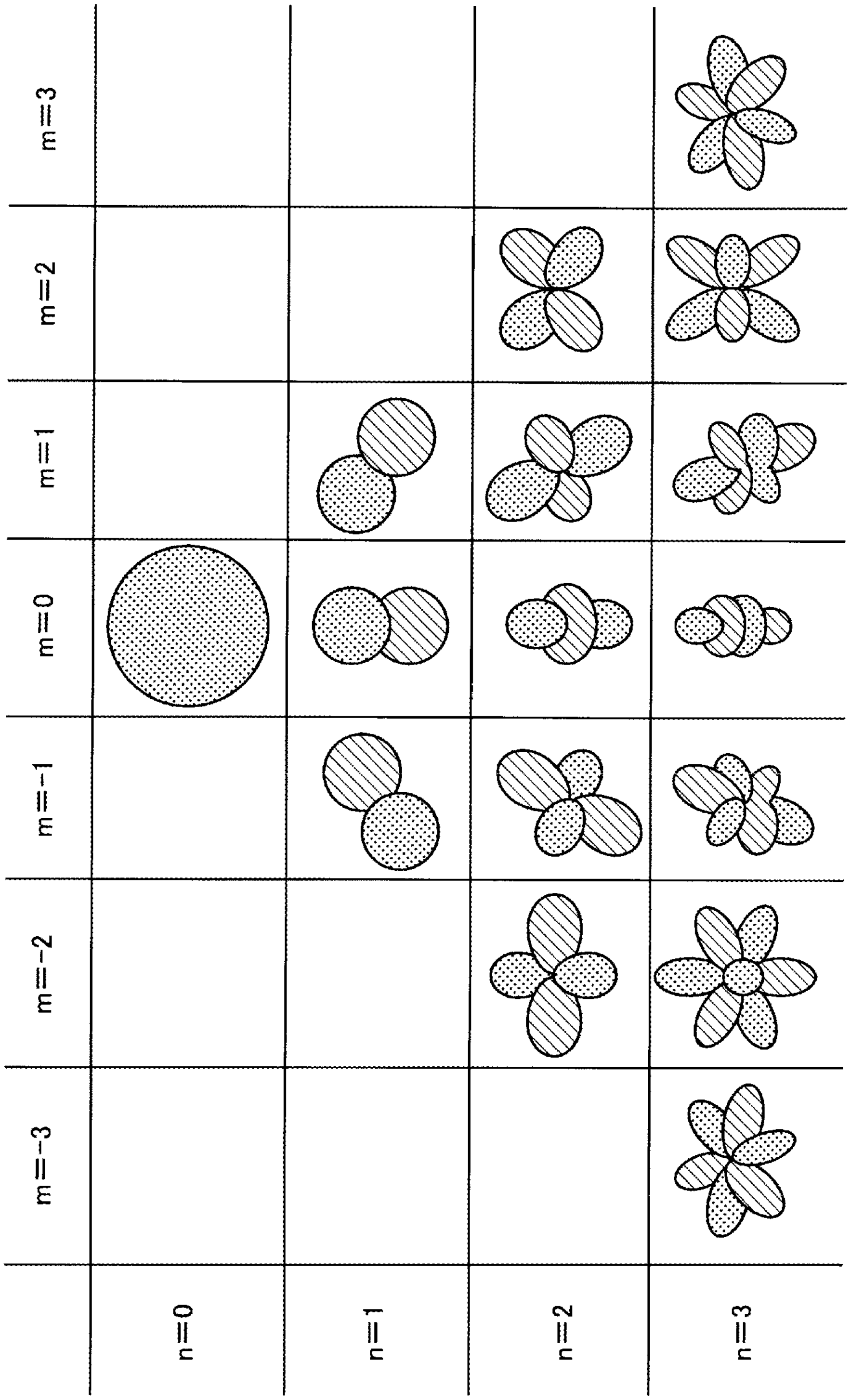
FIG. 4 is a diagram illustrating an example of spherical harmonics up to degree n=3.

It should be noted that an example of the spherical harmonics up to degree n=3 is shown in FIG. 4. In FIG. 4, dotted hatching and diagonal hatching denote positive phases and negative phases, respectively. Parts of order m greater than or equal to 0 denote real parts, while parts of order m less than 0 denote imaginary parts.

The expansion coefficient conversion unit 12 converts the spherical harmonics expansion coefficient, which has been calculated by the expansion coefficient calculation unit 11, into the weight factor for the superposition of the multipole sources.

The multipole sources will be described here. The multipole sources are sound sources including an opposite phase distribution of point sources having the same amplitude in positions extremely close to the origin. By way of example, Expression (4) expresses a sound pressure distribution of the multipole sources where the point sources are arranged at very small intervals of 2d on an x-y plane, as follows.

[Math. 4]

$$\begin{aligned} M_\mu^\nu(r,k) &= (d)^{\mu+\nu}\frac{\partial^{\mu+\nu}}{\partial x^\mu \partial y^\nu}G_{3D}(r,k) \\ &= -\frac{jk}{4\pi}h_0^{(2)}(kr)(-jdk)^{\mu+\nu}\cos^\mu\phi\sin^\nu\theta \end{aligned} \qquad \text{Expression (4)}$$

Figure 5:
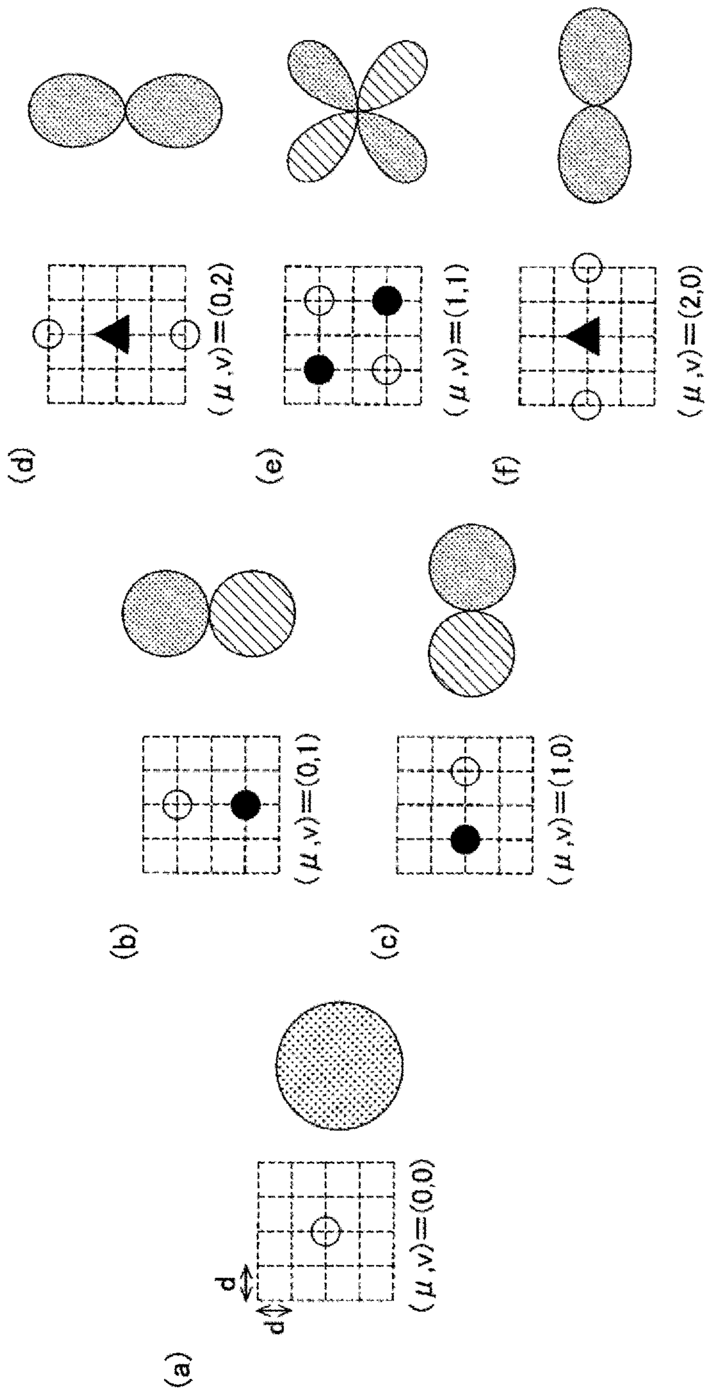
FIG. 5 is a diagram illustrating an example of positions and sound pressures of point sources constituting multipole sources up to $\mu+\nu=2$.

$M_\mu^\nu(r,k)$: the sound pressure distribution of the multipole sources
k: a wave number ($k=\omega/c$)
$\omega$: angular frequency ($=2\pi f$)
c: sound speed, f: frequency
2d the interval between the point sources
j: the imaginary number ($=\sqrt{-1}$)
$h_0^{(2)}$: a spherical Hankel function of the second kind of order 0
$\mu,\nu$: the numbers of differentials in the x-axis direction and the y-axis direction where $n\geq\mu+\nu\geq 0$ ($\mu\geq 0$, $\nu\geq 0$), $|m|=\mu+\nu$ FIG. 5 shows an example of the positions and sound pressures of the point sources constituting the multipole sources up to $\mu+\nu=2$. In FIG. 5, "○" denotes g=1, "●" denotes g=−1, and "▲" denotes g=−2. The position of each sound source is expressed in Expression (5).

[Math. 5]

$$x_{\mu,\alpha}=x_c+(\mu-2\alpha)d \ldots (0\leq\alpha\leq\mu)$$

$$y_{\nu,\beta}=y_c+(\nu-2\beta)d \ldots (0\leq\beta\leq\nu) \qquad \text{Expression (5)}$$

$x_{\mu,\alpha}$: the position (x-coordinate) of the point source
$y_{\nu,\beta}$: the position (y-coordinate) of the point source
$(x_c,y_c)$: the central coordinate of the multipole sources The sound pressure of the point source with respect to the x-axis direction is defined in Expression (6). The sound pressure of the point source with respect to the y-axis direction is also defined similarly.

[Math. 6]

$$g_{\mu,\alpha}=\begin{cases} 1 & (\alpha=0) \\ g_{\mu-1,\alpha}-g_{\mu-1,\alpha-1} & (0<\alpha<\mu) \\ -g_{\mu-1,\alpha-1} & (\alpha=\mu) \end{cases} \qquad \text{Expression (6)}$$

$g_{\mu,\alpha}$: the sound pressure of the point source with respect to the x-axis direction The sound pressure of the point source constituting the multipole sources of order $(\mu,\nu)$ is defined below.

[Math. 7]

$$g_{\mu,\alpha}{}^{\nu,\beta}=g_{\mu,\alpha}\cdot g_{\nu,\beta} \qquad \text{Expression (7)}$$

$g_{\mu,\alpha}{}^{\nu,\beta}$: the sound pressure of the point source
$g_{\mu,\alpha}$: the sound pressure of the point source with respect to the x-axis direction
$g_{\nu,\beta}$: the sound pressure of the point source with respect to the y-axis direction The sound field obtained through the superposition of the multipole sources is expressed in Expression (8).

[Math. 8]

$$S(r,\omega)=\sum_{\mu=0}^{\infty}\sum_{\nu=0}^{\infty}D_\mu^\nu(\omega)M_\mu^\nu(\theta,\phi,\omega) \qquad \text{Expression (8)}$$

$$M_\mu^\nu(r,\omega)=-\frac{jk}{4\pi}\sum_{\alpha=0}^{\mu}\sum_{\beta=0}^{\nu}g_{\mu,\alpha}^{\nu,\beta}h_0^{(2)}\left(k\left|r-r_{\mu,\alpha}^{\nu,\beta}\right|\right)$$

D: the weight factor for the multipole sources

In accordance with Expression (4) and Expression (8), the sound field with the multipole speaker array is defined by Expression (9).

[Math. 9]

$$S(r,\omega)=\sum_{\mu=0}^{\infty}\sum_{\nu=0}^{\infty}D_\mu^\nu(\omega)\left\{-\frac{jk}{4\pi}h_0^2(kr)(-jdk)^{\mu+\nu}\cos^\mu\phi\sin^\nu\theta\right\} \qquad \text{Expression (9)}$$

k: the wave number ($k=\omega/c$)
$\omega$: angular frequency ($=2\pi f$)
c: sound speed, f: frequency
j: the imaginary number ($=\sqrt{-1}$)
$h_0^{(2)}$: the spherical Hankel function of the second kind of order 0
$\mu,\nu$: the numbers of differentials in the x-axis direction and the y-axis direction where $n\geq\mu+\nu\geq 0$ ($\mu\infty 0$, $\nu\geq 0$), $|m|=\mu+\nu$
D: the weight factor for the multipole sources In addition, the outward sound field is defined with the spherical harmonics in Expression (10).

[Math. 10]

$$\begin{aligned} S(r,\omega) &= \sum_{n=0}^{\infty}\sum_{m=-n}^{n}A_n^m(\omega)h_n^{(2)}(kr)Y_n^m\left(\frac{\pi}{2},\phi\right) \\ &= h_n^{(2)}(kr)\left[\sum_{n=0}^{\infty}\left\{A_n^0F_n^0\left(\frac{\pi}{2}\right)\right\}+\sum_{n=1}^{\infty}\sum_{m=1}^{n}\left\{A_n^mY_n^m\left(\frac{\pi}{2},\phi\right)+A_n^{-m}Y_n^{-m}\left(\frac{\pi}{2},\phi\right)\right\}\right] \\ &= h_0(kr)\left[\sum_{n=0}^{\infty}\left\{j^nA_n^0F_n^0\left(\frac{\pi}{2}\right)\right\}+\sum_{n=1}^{\infty}\sum_{m=1}^{n}j^nF_n^m\left(\frac{\pi}{2}\right)\left\{A_n^me^{jm\phi}+(-1)^mA_n^{-m}e^{-jm\phi}\right\}\right] \end{aligned} \qquad \text{Expression (10)}$$

$$F_n^m(\theta)=\sqrt{\frac{2n+1}{4\pi}\frac{(n-m)!}{(n+m)!}}P_n^m(\cos\theta)$$

$h_n^{(2)}(\bullet)$: the spherical Hankel function of the second kind of order n $Y_n^{-m}(\theta,\phi)=(-1)^m Y_n^m(\theta,\phi)$ $h_n^{(2)}(kr)=j^n h_0^{(2)}(kr)$ (kr is sufficiently large)

With respect to Expression (10), Euler's theorem shown in Expression (11) and a binominal theorem may be used to modify Expression (10) as shown in Expression (12).

[Math. 11]

$$e^{jn\phi} = (\cos\phi + j\sin\phi)^m \qquad \text{Expression (11)}$$

[Math. 12]

$$S(r,\omega) = h_0(kr)\left[\sum_{n=0}^{\infty}\left\{j^n A_n^0 F_n^0\left(\frac{\pi}{2}\right)\right\} + \sum_{n=1}^{\infty}\sum_{m=1}^{n}\sum_{\nu=0}^{m} j^{n+\nu} F_n^m\left(\frac{\pi}{2}\right)\binom{m}{\nu}\{A_n^m + (-1)^{m+\nu}A_n^{-m}\}\cos^{m-\nu}\phi\sin^{\nu}\phi\right\} \qquad \text{Expression (12)}$$

In addition, let μ in Expression (9) be m−ν. Then comparison of coefficients of $\cos^{m-\nu}\phi \sin^{\nu}\phi$ between in Expression (9) and in Expression (12) derives Expression (13).

[Math. 13]

$$D_{m-\nu}^{\nu}\left(-\frac{jk}{4\pi}\right)(-jdk)^m = \begin{cases} \sum_{n=m}^{\infty} j^n A_n^0 F_n^0\left(\frac{\pi}{2}\right) & (m=0) \\ \sum_{n=m}^{\infty} j^{n+\nu} F_n^m\left(\frac{\pi}{2}\right)\binom{m}{\nu}\{A_n^m + (-1)^{m+\nu}A_n^{-m}\} & (m>0) \end{cases} \qquad \text{Expression (13)}$$

Furthermore, let m in Expression (13) be μ+ν. Then the expression is arranged to give Expression (14). The expansion coefficient conversion unit 12 converts the spherical harmonics expansion coefficient into the weight factor for the superposition of the multipole sources, in accordance with Expression (14).

[Math. 14]

$$D_{\mu}^{\nu} = -\frac{4\pi}{jk}\begin{cases} \sum_{n=0}^{\infty} j^n A_n^0 F_n^0\left(\frac{\pi}{2}\right) & (\mu+\nu=0) \\ \frac{1}{(-jdk)^{\mu}}\sum_{n=\mu+\nu}^{\infty} j^{n+\nu} F_n^{\mu+\nu}\left(\frac{\pi}{2}\right)\binom{\mu+\nu}{\nu}\{A_n^{\mu+\nu} + (-1)^{\mu+2\nu}A_n^{-\mu-\nu}\} & (\mu+\nu>0) \end{cases} \qquad \text{Expression (14)}$$

$D_{\mu}^{\nu}$: the weight factor for the superposition of the multipole sources A: the spherical harmonics expansion coefficient m,n: the order and the degree of the multipole in each of the x-axis direction and the y-axis direction where $-n \le m \le n$, $n \ge 0$, $m=\mu+\nu$ j: an imaginary unit d: an interval between neighboring speakers k: the wave number ($k=2\pi f/c$)

f and c denote frequency and sound speed of a sound signal to be controlled, respectively The filter coefficient calculation unit 13 calculates, from the weight factor, a filter coefficient corresponding to each speaker that is included in the multipole speaker array and provides the output outwardly. The filter coefficient calculation unit 13 obtains the filter coefficient corresponding to each speaker by multiplying the weight factor for the superposition of the multipoles, which has been output by the expansion coefficient conversion unit 12, by the gain of each speaker constituting the multipole sources.

The convolution operation unit 14 convolves the filter coefficient corresponding to each speaker into the input acoustic signal to calculate the output acoustic signal for each speaker. The convolution operation unit 14 calculates the output acoustic signal for each speaker, from the input acoustic signal that is input, and the filter coefficient corresponding to each speaker constituting the multipole speaker array.

The output acoustic signal output by the signal processing device 1 is input to each speaker constituting the multipole speaker array. The output acoustic signal is reproduced at each speaker to thereby reproduce the desired sound field.

(Signal Processing Method)

Figure 6:
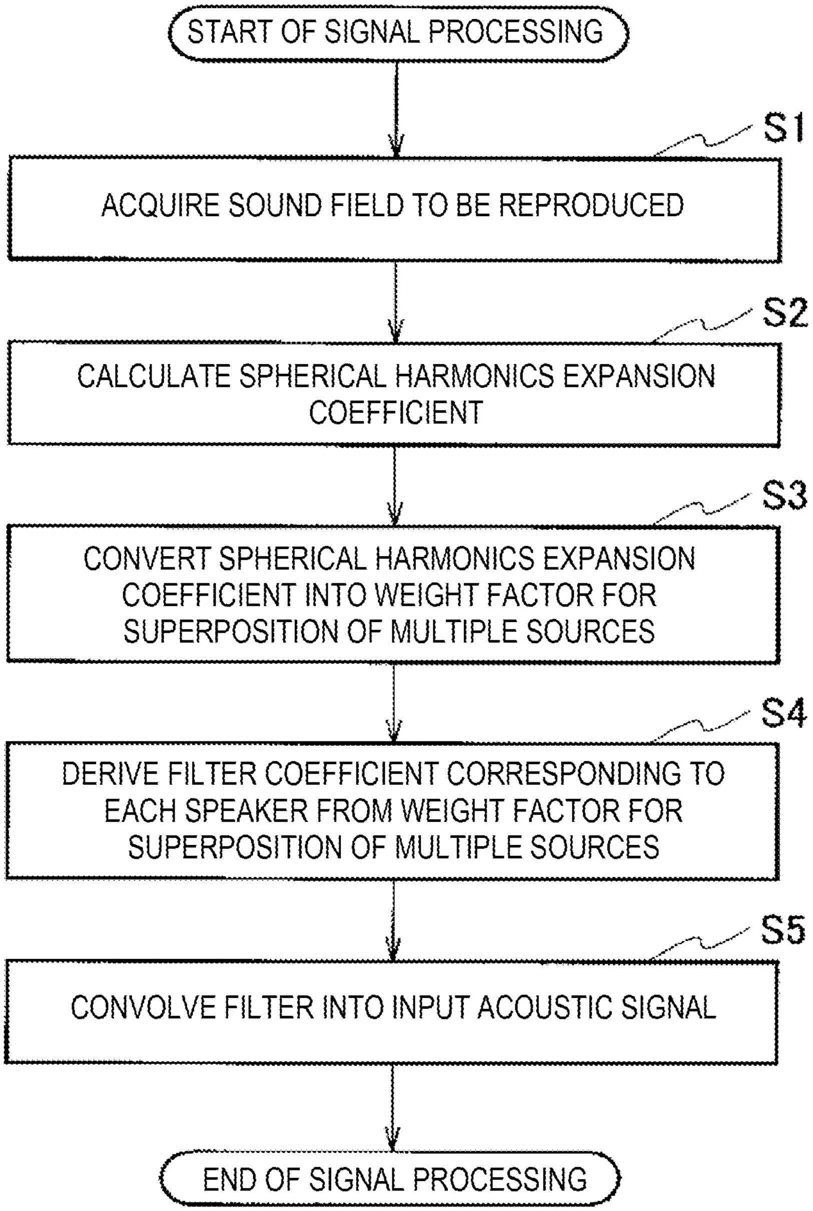
FIG. 6 is a flowchart illustrating processing in the signal processing device.
Figure 7:
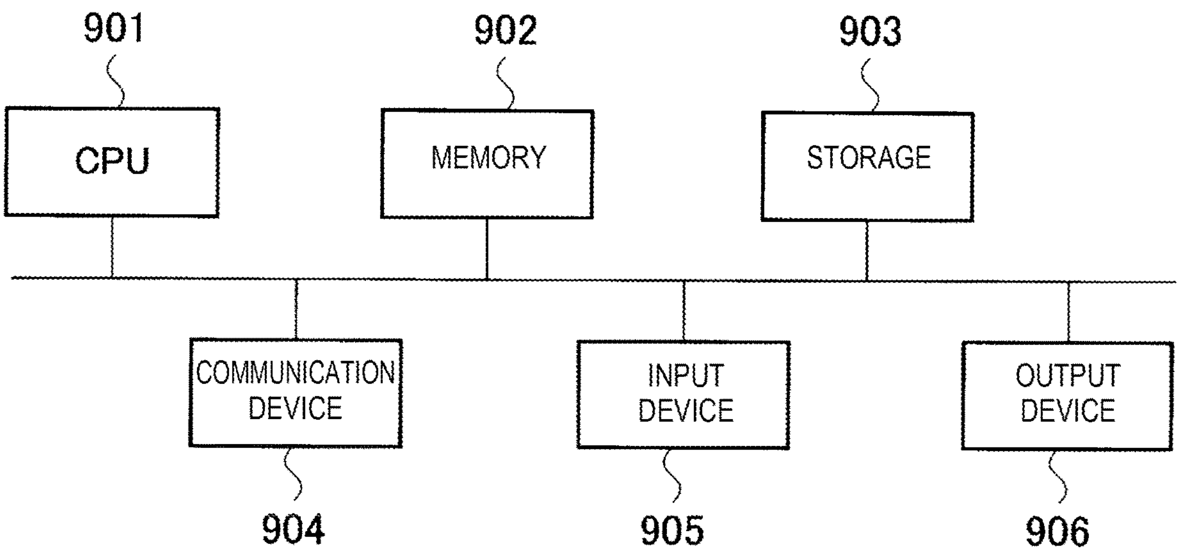
FIG. 7 is a diagram illustrating a hardware configuration of a computer used as the signal processing device.

With reference to FIG. 6, a signal processing method according to the embodiment of the present invention will be described.

At step S1, the signal processing device 1 first acquires data of the sound field to be reproduced.

At step S2, from the data of the sound field acquired at step S1, the signal processing device 1 next calculates the spherical harmonics expansion coefficient. At step S3, the signal processing device 1 converts the spherical harmonics expansion coefficient calculated at step S2, into the weight factor for the superposition of the multipole sources.

At step S4, the signal processing device 1 calculates the filter coefficient for each speaker from the weight factor for the superposition of the multipole sources calculated at step S3. At step S5, the signal processing device 1 convolves the filter coefficient for each speaker calculated at step S4, into the input acoustic signal to calculate the output acoustic signal for each speaker.

Instead of deriving the weight factor directly from the multipole sources, the signal processing device 1 according to the embodiment of the present invention compares the sound field expressed with the spherical harmony to the sound field expressed with the multipole sources, and thereby analytically converts the sound field with the spherical harmonics into the weight factor for the superposition of the multipoles. The signal processing device 1 can thus generate the acoustic signal that reproduces the desired sound field with the multipole speaker array.

As the above described signal processing device 1 of the present embodiment, for example, a general-purpose computer system is used, which includes a CPU (Central Processing Unit, processor) 901, a memory 902, a storage 903 (HDD: Hard Disk Drive, SSD: Solid State Drive), a communication device 904, an input device 905, and an output device 906. In this computer system, each function of the signal processing device 1 is implemented by the CPU 901 executing a predetermined signal processing program loaded on the memory 902.

It should be noted that the signal processing device 1 may be implemented in one computer, or may be implemented in multiple computers. The signal processing device 1 may also be a virtual machine implemented in the computer.

The signal processing program for implementing each function of the signal processing device 1 may be stored in a computer-readable recording medium, such as an HDD, an SSD, a USB (Universal Serial Bus) memory, a CD (Compact Disc), and a DVD (Digital Versatile Disc), and may also be delivered via a network.

It should be noted that the present invention is not limited to the above described embodiment, and numerous modifications can be made within the scope of the gist of the present invention.

REFERENCE SIGNS LIST

1 Signal processing device
11 Expansion coefficient calculation unit
12 Expansion coefficient conversion unit
13 Filter coefficient calculation unit
14 Convolution operation unit
901 CPU
902 Memory
903 Storage
904 Communication device
905 Input device
906 Output device
M Microphone
O Sound source
P Speaker

The invention claimed is:

1. A signal processing device, comprising:

an expansion coefficient calculation unit, implemented using one or more computing devices, configured to, from an outward sound field to be reproduced, calculate a spherical harmonics expansion coefficient for reproducing the sound field;

an expansion coefficient conversion unit, implemented using one or more computing devices, configured to convert the calculated spherical harmonics expansion coefficient into a weight factor for superposition of multipole sources;

a filter coefficient calculation unit, implemented using one or more computing devices, configured to, from the weight factor, calculate a filter coefficient corresponding to each speaker included in a multipole speaker array, the each speaker providing output outwardly; and a convolution operation unit, implemented using one or more computing devices, configured to convolve the filter coefficient corresponding to the each speaker into an input acoustic signal to calculate an output acoustic signal for the each speaker.

2. The signal processing device according to claim 1, wherein the expansion coefficient conversion unit converts the spherical harmonics expansion coefficient into the weight factor for the superposition of the multipole sources, in accordance with Expression (1):

[Math. 1]

Expression (1)

$$D_\mu^\nu = -\frac{4\pi}{jk}\begin{cases} \sum_{n=0}^{\infty} j^n A_n^0 F_n^0\left(\frac{\pi}{2}\right) & (\mu+\nu=0) \\ \frac{1}{(-jdk)^\mu}\sum_{n=\mu+\nu}^{\infty} j^{n+\nu} F_n^{\mu+\nu}\left(\frac{\pi}{2}\right) & \\ \binom{\mu+\nu}{\nu}\left\{A_n^{\mu+\nu} + (-1)^{\mu+2\nu} A_n^{-\mu-\nu}\right\} & (\mu+\nu>0) \end{cases}$$

$D_\mu^\nu$: the weight factor for the superposition of the multipole sources
A: the spherical harmonics expansion coefficient
m,n: an order and a degree of a multipole in each of an x-axis direction and a y-axis direction where $-n \leq m \leq n$, $n \geq 0$, $m = \mu + \nu$
j: an imaginary unit
d: an interval between neighboring speakers
k: a wave number ($k = 2\pi f/c$)
f and c denote frequency and sound speed of a sound signal to be controlled, respectively.

3. A signal processing method, comprising:

calculating, by a computer from an outward sound field to be reproduced, a spherical harmonics expansion coefficient for reproducing the sound field;

converting, by the computer, the calculated spherical harmonics expansion coefficient into a weight factor for superposition of multipole sources;

calculating, by the computer from the weight factor, a filter coefficient corresponding to each speaker included in a multipole speaker array, the each speaker providing output outwardly; and convolving, by the computer, the filter coefficient corresponding to the each speaker into an input acoustic signal to calculate an output acoustic signal for the each speaker.

4. The signal processing method according to claim 3, wherein converting the calculated spherical harmonics expansion coefficient comprises converting the spherical harmonics expansion coefficient into the weight factor for the superposition of the multipole sources, in accordance with Expression (2):

[Math. 2]

Expression (2)

$$D_\mu^\nu = -\frac{4\pi}{jk}\begin{cases} \sum_{n=0}^{\infty} j^n A_n^0 F_n^0\left(\frac{\pi}{2}\right) & (\mu+\nu=0) \\ \frac{1}{(-jdk)^\mu}\sum_{n=\mu+\nu}^{\infty} j^{n+\nu} F_n^{\mu+\nu}\left(\frac{\pi}{2}\right)\binom{\mu+\nu}{\nu}\left\{A_n^{\mu+\nu} + (-1)^{\mu+2\nu} A_n^{-\mu-\nu}\right\} & (\mu+\nu>0) \end{cases}$$

$D_\mu^\nu$: the weight factor for the superposition of the multipole sources

A: the spherical harmonics expansion coefficient m,n: an order and a degree of a multipole in each of an x-axis direction and a y-axis direction where $-n \le m \le n$, $n \ge 0$, $m=\mu+\nu$ j: an imaginary unit d: an interval between neighboring speakers k: a wave number ($k=2\pi f/c$)

f and c denote frequency and sound speed of a sound signal to be controlled, respectively.

5. A non-transitory recording medium storing a signal processing program, wherein execution of the signal processing program causes one or more computers to perform operations comprising:

calculating, an outward sound field to be reproduced, a spherical harmonics expansion coefficient for reproducing the sound field;

converting the calculated spherical harmonics expansion coefficient into a weight factor for superposition of multipole sources;

calculating, from the weight factor, a filter coefficient corresponding to each speaker included in a multipole speaker array, the each speaker providing output outwardly; and convolving the filter coefficient corresponding to the each speaker into an input acoustic signal to calculate an output acoustic signal for the each speaker.

6. The recording medium according to claim 5, wherein converting the calculated spherical harmonics expansion coefficient comprises converting the spherical harmonics expansion coefficient into the weight factor for the superposition of the multipole sources, in accordance with Expression (3):

[Math. 3]

$$D_\mu^\nu = -\frac{4\pi}{jk}\begin{cases} \sum_{n=0}^{\infty} j^n A_n^0 F_n^0\left(\frac{\pi}{2}\right) & (\mu+\nu=0) \\ \frac{1}{(-jdk)^\mu}\sum_{n=\mu+\nu}^{\infty} j^{n+\nu} F_n^{\mu+\nu}\left(\frac{\pi}{2}\right)\binom{\mu+\nu}{\nu}\left\{A_n^{\mu+\nu}+(-1)^{\mu+2\nu}A_n^{-\mu-\nu}\right\} & (\mu+\nu>0) \end{cases} \quad \text{Expression (3)}$$

$D_\mu^\nu$: the weight factor for the superposition of the multipole sources

A: the spherical harmonics expansion coefficient m,n: an order and a degree of a multipole in each of an x-axis direction and a y-axis direction where $-n \le m \le n$, $n \ge 0$, $m=\mu+\nu$ j: an imaginary unit d: an interval between neighboring speakers k: a wave number ($k=2\pi f/c$)

f and c denote frequency and sound speed of a sound signal to be controlled, respectively.

* * * * *